(12) United States Patent
Hurst et al.

(10) Patent No.: US 8,322,517 B1
(45) Date of Patent: Dec. 4, 2012

(54) LIGHTWEIGHT CONVEYOR PALLET

(75) Inventors: Richard Hurst, New Haven, MI (US); Alexander F. Spillane, Highland, MI (US)

(73) Assignee: Norgren Automation Solutions, LLC, Clinton Township, MI (US)

( * ) Notice: Subject to any disclaimer, the term of this patent is extended or adjusted under 35 U.S.C. 154(b) by 549 days.

(21) Appl. No.: 12/341,319

(22) Filed: Dec. 22, 2008
(Under 37 CFR 1.47)

Related U.S. Application Data (60) Provisional application No. 61/015,573, filed on Dec. 20, 2007.

(51) Int. Cl.
*B65G 29/00* (2006.01)

(52) U.S. Cl. .................. 198/465.4; 198/780; 104/168

(58) Field of Classification Search ............... 198/678.1, 198/469.1, 867.13; 104/168
See application file for complete search history.

(56) References Cited

U.S. PATENT DOCUMENTS

| | | | |
|---|---|---|---|
| 3,610,172 A | 10/1971 | Wharton | |
| 3,926,303 A | 12/1975 | McCall | |
| 3,927,760 A | 12/1975 | McCall | |
| 4,484,525 A | 11/1984 | Forshee et al. | |
| 4,720,228 A | 1/1988 | Horiguchi et al. | |
| 6,651,799 B1 | 11/2003 | Rice et al. | |
| 6,799,673 B2 * | 10/2004 | Kilabarda | 198/465.4 |
| 6,938,752 B2 | 9/2005 | Steward et al. | |
| 7,014,033 B2 | 3/2006 | Sticht et al. | |
| 7,055,677 B2 | 6/2006 | Hartness et al. | |
| 2002/0023823 A1 * | 2/2002 | Hoffmann et al. | 198/685 |
| 2005/0061621 A1 | 3/2005 | Cruysen et al. | |

* cited by examiner

*Primary Examiner* — Kavel Singh
(74) *Attorney, Agent, or Firm* — Young Basile Hanlon & MacFarlane P.C.

(57) ABSTRACT

A lightweight pallet for supporting and carrying workpieces along an overhead transfer conveyor. A metallic conveyor carrier is adapted to be carried by the overhead transfer conveyor, and a lightweight, non-metallic base is connected to the conveyor carrier. A first lightweight, non-metallic support member is connected to and extends downward from the base. The first support member is substantially planar and is adapted to support the workpiece. A first lightweight, non-metallic brace member is connected to the base and the first support member for stabilizing and supporting the first support member. The first brace member is substantially planar, wherein the first brace member extends substantially perpendicular to the first support member, and the first support member and the second support member cooperate to define a substantially T-shaped structure that extends downward from the base.

20 Claims, 8 Drawing Sheets

LIGHTWEIGHT CONVEYOR PALLET

CROSS-REFERENCE TO RELATED APPLICATIONS

This application claims the benefit of U.S. Provisional Patent Application Ser. No. 61/015,573, filed on Dec. 20, 2007.

FIELD OF THE INVENTION

The present invention relates to conveyor systems, and in particular, a lightweight overhead conveyor pallet for carrying workpieces along an overhead transfer conveyor.

BACKGROUND OF THE INVENTION

Overhead conveyor pallet systems are well known within the manufacturing industry. Such overhead conveyor pallet systems commonly utilize a steel plate-like pallet having rollers mounted thereon that roll between a pair of overhead guide rails. The pallet typically has a steel fixture mounted thereon that hangs down from the pallet and is designed for hanging a workpiece from the steel fixture. Such workpieces may be rather large and heavy, and thus, the steel fixture must be relatively strong in order to support the weight of the workpiece. For example, in the automotive industry, such workpieces may include side body panels and fenders of automobiles. A chain-driven drive system engages the pallet and pulls the pallet and the workpiece along the guide rails, thereby transporting the workpiece from one location to the next.

The chain-driven drive system often includes a clutch drive on top of the pallet such that the pallet may engage and disengage the chain drive. By allowing the pallets to engage and disengage the chain drive, the workpieces can be idly stacked in a queue so that the workpieces may be delivered upon demand. For instance, a number of workpieces may be held in a queue, and when a worker or machine is ready to perform an operation on the workpiece, the clutch drive may engage the chain drive so as to pull the pallet and the workpiece to the desired location. Once the workpiece is removed from the pallet, the pallet may be pulled and guided along a 180° turn upward such that the pallet is turned upside down and driven back to the beginning of the conveyor. Upon reaching the opposite end of the conveyor, the pallet is guided along a 180° turn downward, such that the pallet is turned right-side-up, so that the pallet may be loaded with a new workpiece at the beginning of the conveyor.

Due to the weight of the steel fixtures hanging from the pallets, the chain drive and the clutch drive often malfunction. For instance, the clutch drive may not be able to engage and hold the chain drive under the weight of the pallet, and the weight of the pallets may also place too large of a load on the chain drive, thereby overloading the drive and affecting the speed and performance of the conveyor. The weight of the workpiece may also accentuate the problem. This problem is further accentuated through the rising of the conveyor along its path and the turning of the conveyor upside down to return the pallet to the beginning of the conveyor.

SUMMARY OF THE INVENTION

The present invention relates to a lightweight pallet for supporting and carrying workpieces along an overhead transfer conveyor. The pallet includes a metallic conveyor carrier that is adapted to be carried by the overhead transfer conveyor. A lightweight, non-metallic base is connected to the conveyor carrier. A first lightweight, non-metallic support member is connected to and extends downward from the base. The first support member is substantially planar and is adapted to support the workpiece. A first lightweight, non-metallic brace member is connected to the base and the first support member for stabilizing and supporting the first support member. The first brace member is substantially planar, wherein the first brace member extends substantially perpendicular to the first support member, and the first support member and the second support member cooperate to define a substantially T-shaped structure that extends downward from the base.

The pallet may include at least one lightweight, non-metallic workpiece nest connected to the first support member, wherein the workpiece nest is configured to complementarily engage at least a portion of the workpiece. In addition, the pallet may include at least one metallic part rest connected to the first support member for supporting and locating the workpiece.

A u-shaped recess may be defined in the first support member, and the pallet may include a locator block that is receivable within the u-shaped recess to position the locator block with respect to the first support member. At least one metallic part rest is connected to the locator block for supporting and locating the workpiece.

The conveyor carrier and the base may both be substantially planar, wherein the base and the conveyor carrier are connected in a substantially coplanar fashion.

The pallet may include a second lightweight, non-metallic support member that is connected to and extends downward from the base. The second support member is longitudinally spaced from the first support member, wherein the second support member is adapted to support the workpiece. A second lightweight, non-metallic brace member may be connected to the base and the second support member for stabilizing and supporting the second support member.

BRIEF DESCRIPTION OF THE DRAWINGS

The description herein makes reference to the accompanying drawings, wherein like-referenced numerals refer to like parts throughout several views and wherein.

DETAILED DESCRIPTION OF THE EMBODIMENTS

Referring to the drawings, the present invention will now be described in detail with reference to the disclosed embodiments.

As illustrated in FIGS. 1-17, the present invention provides a lightweight overhead conveyor pallet 10 for carrying a workpiece 12 along an overhead transfer conveyor 1 that includes a first rail 2 and a second rail 3. The conveyor pallet 10 provides a metallic conveyor carrier 14 adaptable to be carried by the overhead transfer conveyor 1. A lightweight, non-metallic base 16 is connected to the conveyor carrier 14, and at least two lightweight, non-metallic support members 18, 20 are connected to and extend downward from the base 16. A pair of lightweight, non-metallic brace members 22, 24 are connected to the base 16, and each brace member 22, 24 is connected to a support member 18, 20, respectively, in order to stabilize and support the support members 18, 20. A lightweight, non-metallic workpiece nest 26, 28 is connected to each of the support members 18, 20, respectively, for holding and supporting the workpiece 12. Several metallic part rests 30, 32, 34 are connected to the support members 18, 20 for supporting and locating the workpiece 12.

The lightweight conveyor pallet 10 of the present invention is ideally suited for heavy or larger workpieces 12, such as body side panels and fenders of automobiles; however, the present invention is not limited to utilizing the present invention with such workpieces 12, but rather, any number of workpieces 12 may be utilized in conjunction with the conveyor pallet 10 of the present invention. In addition, the lightweight conveyor pallet 10 of the present invention is ideally suited for use on the overhead transfer conveyor 1 due to the problems associated with the weight of such previously-designed conveyor pallets, as described and disclosed in the background of the invention. However, it should be noted that the present invention is not limited to using the conveyor pallet 10 on such overhead transfer conveyor applications, but rather, the lightweight conveyor pallets 10 of the present invention may be utilized for any conveyor transport system, wherein the weight of the conveyor pallets 10 is a function of the performance and efficiency of the conveyor transport system.

Figure 1:
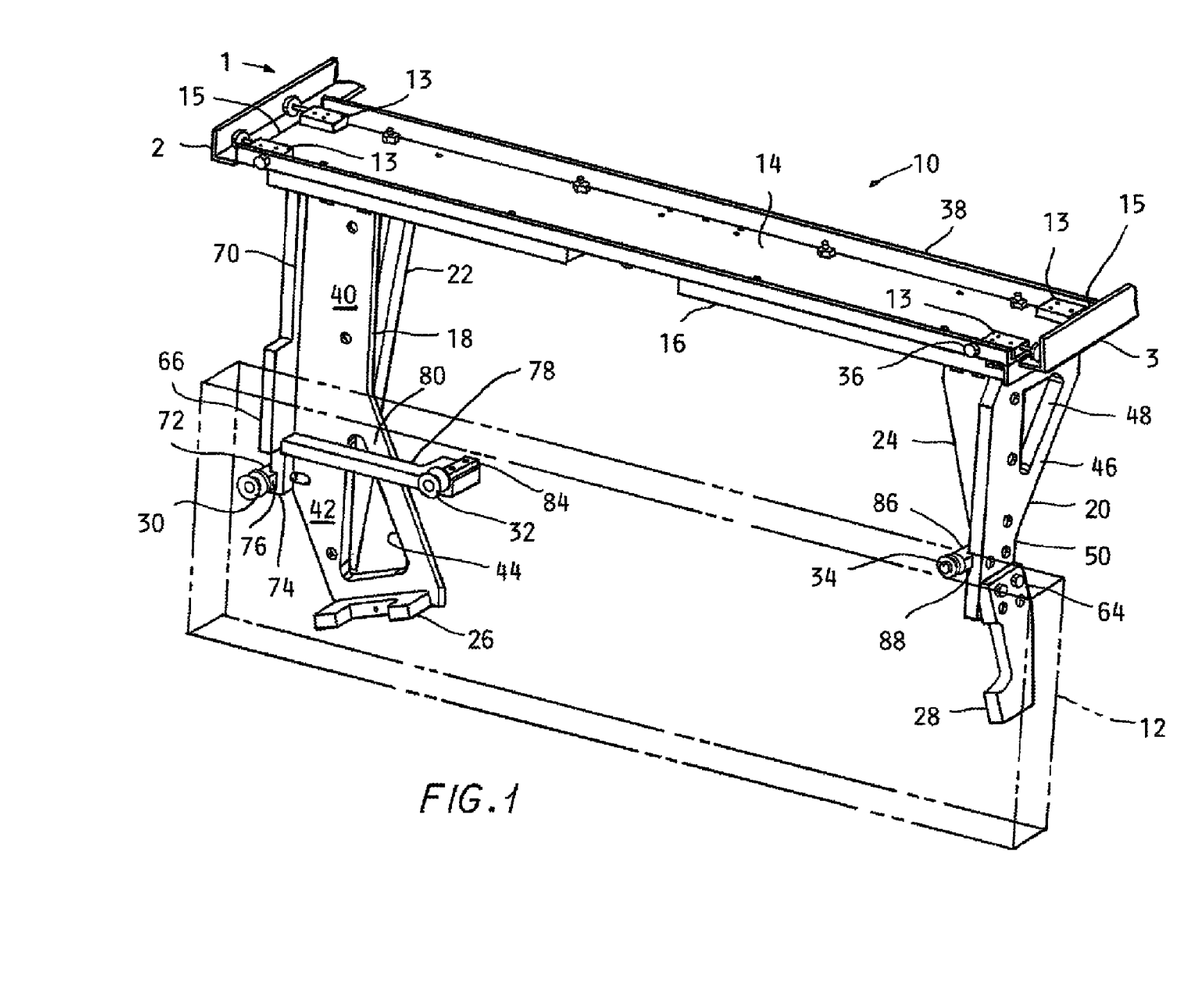
FIG. 1 is an isometric view of the lightweight overhead conveyor pallet of the present invention disposed on an overhead transfer conveyor.
Figure 2:
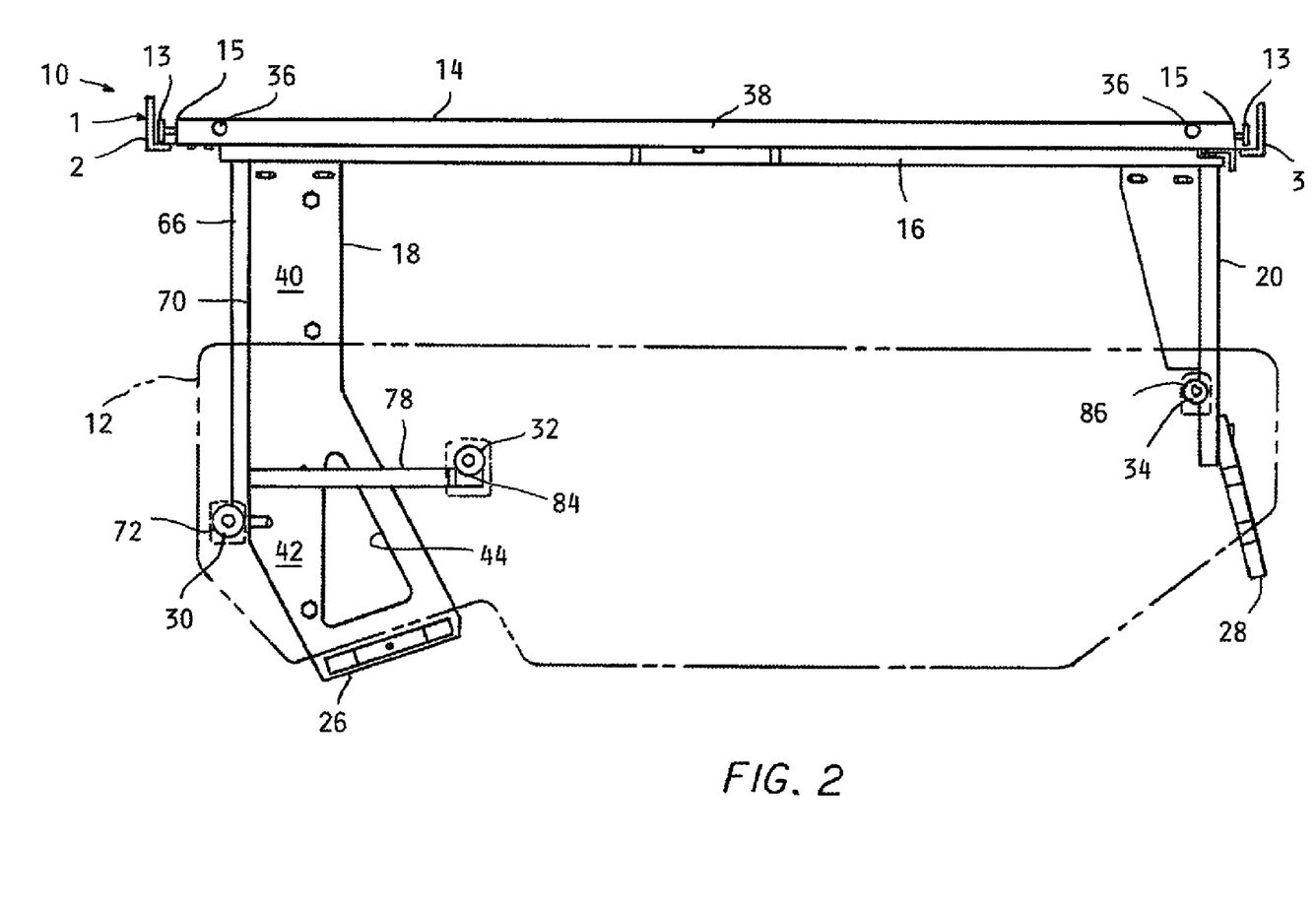
FIG. 2 is a front view of the lightweight overhead conveyor pallet of the present invention disposed on the overhead transfer conveyor.
Figures 3, 4:
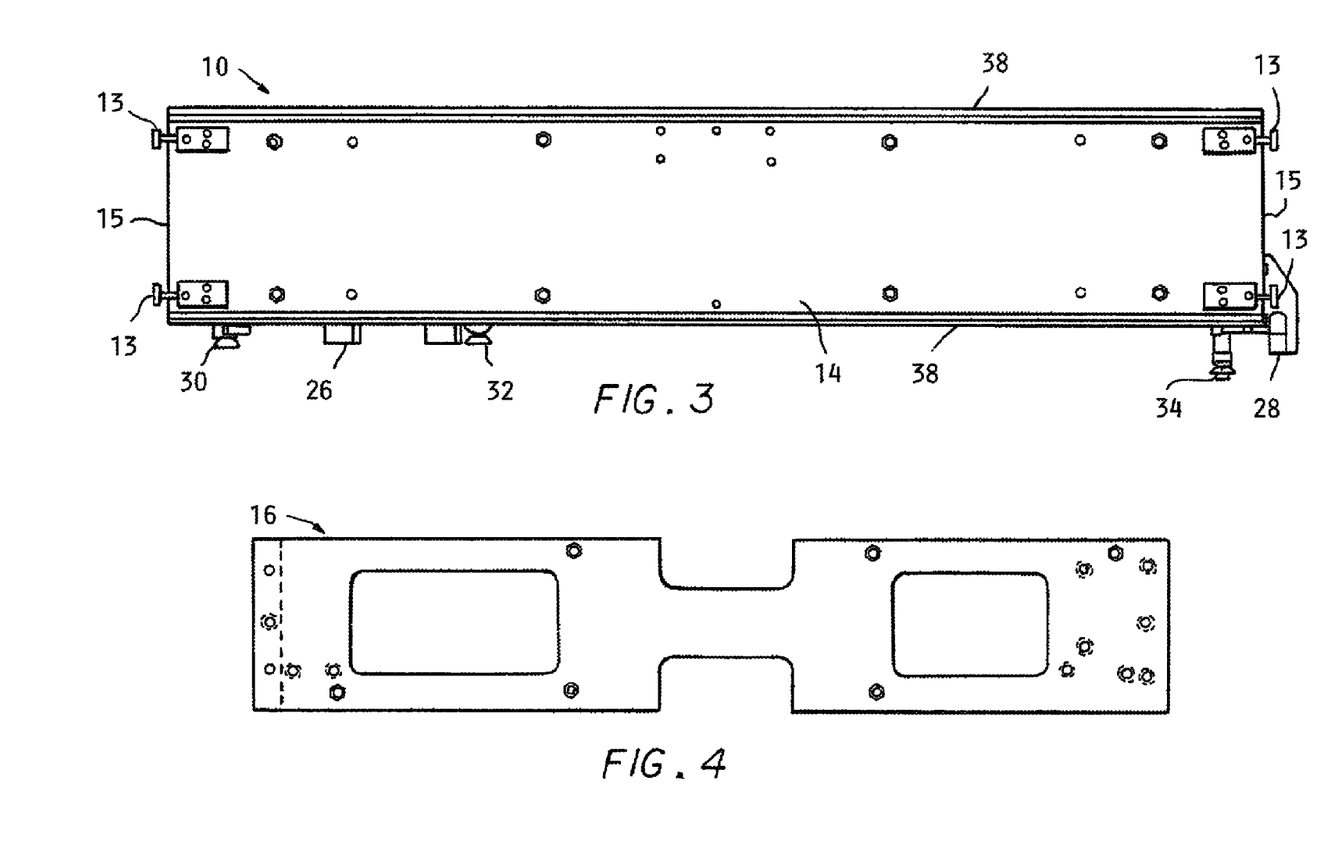
FIG. 3 is a top view of the lightweight overhead conveyor pallet of the present invention.
FIG. 4 is a top view of the base of the lightweight overhead conveyor pallet of the present invention.

In order that the conveyor pallet 10 of the present invention may be carried by the overhead transfer conveyor 1, the conveyor carrier 14 is adapted to be carried and driven by the overhead transfer conveyor 1. As seen in FIGS. 1-3, the conveyor carrier 14 has a substantially rectangular plate-like configuration with turned-up sides 38 to provide a substantially U-shaped cross-sectional configuration. The conveyor carrier 14 is fabricated from a high-strength hardened material, such as steel, so as to withstand the forces generated by the overhead transfer conveyor 1 and to support the weight of the conveyor pallet 10 and the workpiece 12. A plurality of rollers 13 are provided at longitudinally spaced ends 15 of the conveyor carrier 14 for engagement with the rails 2, 3 of the overhead transfer conveyor 1. The conveyor carrier 14 has substantially cylindrical bumper pads 36 connected to the outer surface of the upturned sides 38 of the conveyor carrier 14. The bumper pads 36 act as a cushion by abutting one another when adjacent conveyor pallets 10 abut one another when operating on the overhead transfer conveyor 1. This may typically occur when a plurality of the conveyor pallets 10 are placed adjacent one another in a queue on the overhead transfer conveyor 1.

To connect the lightweight conveyor pallet 10 to the metallic conveyor carrier 14, the base 16 of the conveyor pallet 10 is connected to the conveyor carrier 14 through the use of a plurality of conventional fasteners. As seen in FIGS. 1-2 and 4, the base 16 has a substantially hourglass configuration and is fabricated from a nylon or high-strength plastic material. The nylon or high-strength plastic material substantially reduces the weight of the conveyor pallet 10, yet still provides the conveyor pallet 10 with the strength necessary to support the workpiece 12. In addition, the nylon or high-strength plastic material may be manufactured inexpensively through molding and machining.

Figure 5:
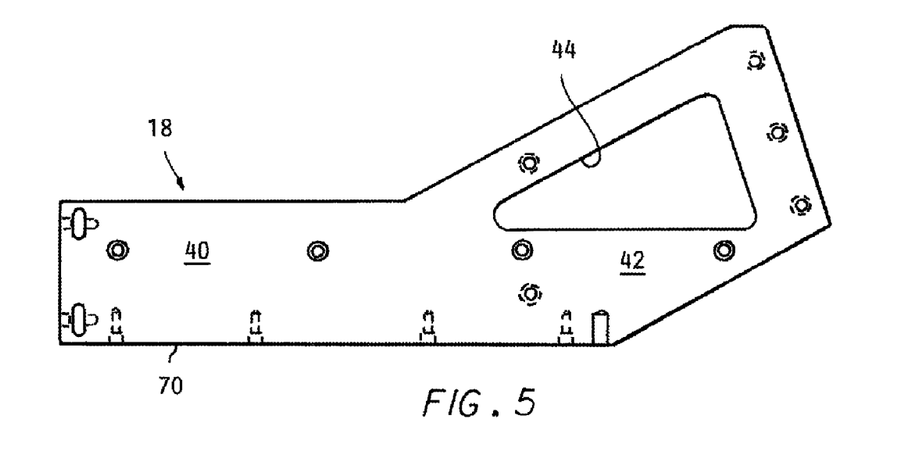
FIG. 5 is a front view of a first support arm of the lightweight overhead conveyor pallet of the present invention.
Figure 6A:
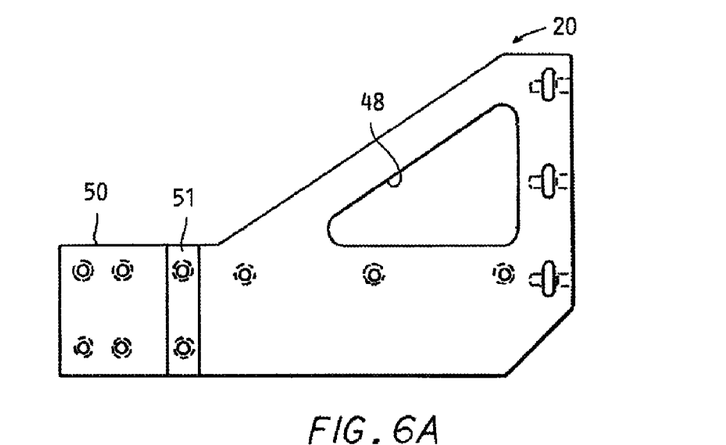
FIG. 6A is a side view of a second support arm of the lightweight overhead conveyor pallet of the present invention.
Figure 6B:
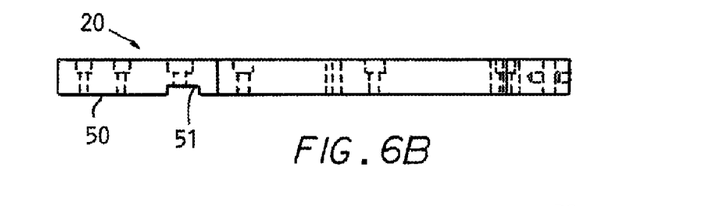
FIG. 6B is a front view of a second support arm of the lightweight overhead conveyor pallet of the present invention.

In order to support the workpiece 12, the conveyor pallet 10 provides the two lightweight support members 18, 20. The support members 18, 20 are also fabricated from a nylon or lightweight plastic material to provide for a reduction in weight of the conveyor pallet 10 while still providing the strength necessary to support the workpiece 12. As seen in FIGS. 1-2 and 5, the support member 18 has a plate-like configuration, wherein one end of the support member 18 is connected to the base 16 through the use of conventional fasteners. The support member 18 extends downward and away from the base 16 of the conveyor pallet 10 and has an upper, substantially rectangular portion 40 which extends integrally into a substantially angular portion 42 that extends inward toward the center of the conveyor pallet 10. A substantially triangular aperture 44 extends through the angular portion 42 of the support member 18 to assist in the overall reduction of the weight of the conveyor pallet 10.

As seen in FIGS. 1-2 and 6A-6B, the support member 20 also has a plate-like configuration and is fabricated from the same nylon or high-strength plastic material, as previously described. The support member 20 is connected to the base 16 of the conveyor pallet 10 at the opposite end of the base 16 as compared to the support member 18, such that the support members 18, are longitudinally spaced along the base 16. The support member 20 is connected to the base 16 at one end of the support member 20 through the use of conventional fasteners. The support member 20 has an upper substantially triangular portion 46 with a substantially triangular aperture 48 extending therethrough to assist in the overall weight reduction of the conveyor pallet 10. A lower substantially rectangular portion 50 extends integrally downward from the upper triangular portion 46 of the support member 20.

Figure 7:
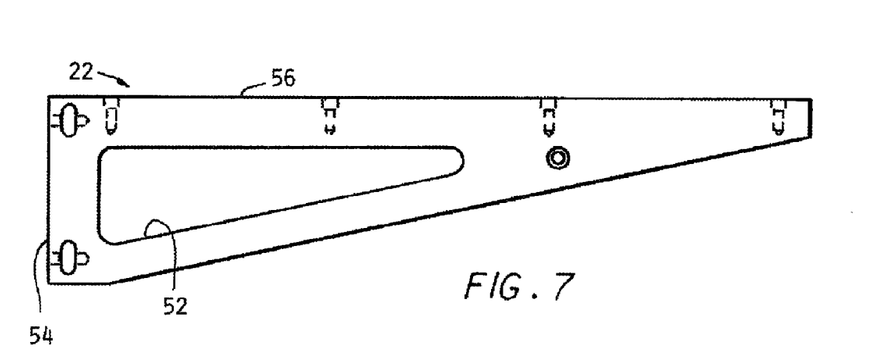
FIG. 7 is a side view of a first brace member of the lightweight overhead conveyor pallet of the present invention.

In order to support the support members 18, 20 from the base 16 of the conveyor pallet 10, the brace members 22, 24, respectively, are connected to the base 16 and the support members 18, 20. As seen in FIGS. 1-2 and 7, the brace member 22 has a plate-like substantially triangular configuration that is fabricated from a nylon or high-strength plastic material, as previously described. The nylon or high-strength plastic material will, again, help to reduce the overall weight of the conveyor pallet 10. In addition, the brace member 22 has a substantially triangular aperture 52 extending therethrough for assisting in reducing the weight of the conveyor pallet 10. The brace member 22 has one of its ends 54 connected to the base 16 through the use of conventional fasteners, and a side 56 of the brace member 22 is connected to the support member 18 through the use of conventional fasteners, such that the brace member 22 extends substantially perpendicular to the support member 18 to provide a substantially T-shaped structure that extends downward from the base 16 thereby enhancing the rigidity of the conveyor pallet 10.

Figure 8:
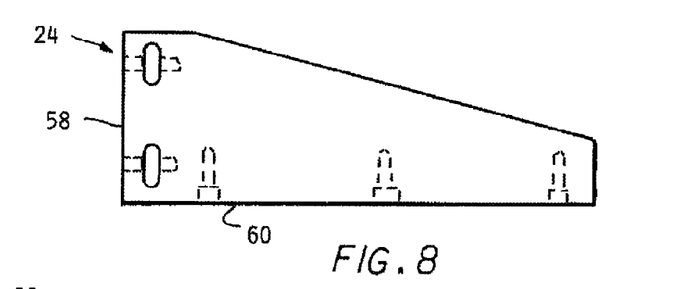
FIG. 8 is a front view of a second brace member of the lightweight overhead conveyor pallet of the present invention.
Figure 9A:
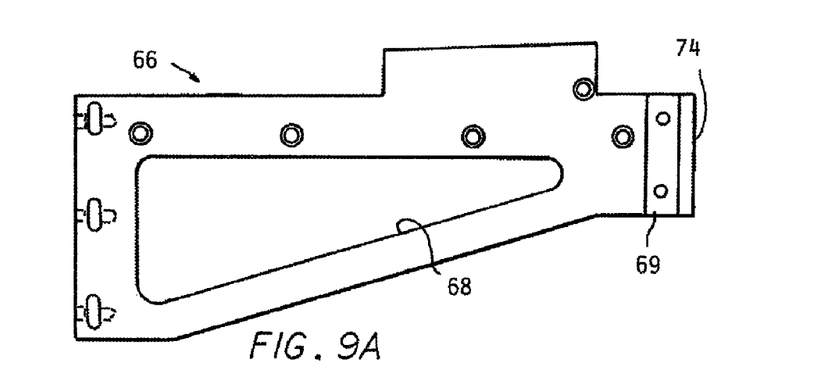
FIG. 9A is a side view of a support rail of the lightweight overhead conveyor pallet of the present invention.
Figure 9B:
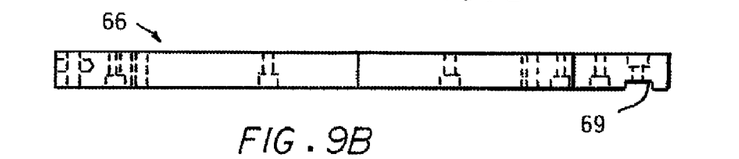
FIG. 9B is a front view of a support rail of the lightweight overhead conveyor pallet of the present invention.

As seen in FIGS. 1-2 and 8, the brace member 24 also has a substantially triangular configuration and is fabricated from the same nylon or lightweight plastic material, as previously described. Again, the use of the nylon or lightweight plastic material will assist in reducing the overall weight of the conveyor pallet 10. The brace member 24 also has a plate-like configuration wherein one end 58 is connected to the base 16 through the use of conventional fasteners, and a side 60 of the brace member 24 is connected to the support member 20 through the use of conventional fasteners, such that the brace member 24 extends substantially perpendicular to the support member 20 to provide a substantially T-shaped structure that extends downward from the base 16, thereby enhancing the rigidity of the conveyor pallet 10.

Figure 10:
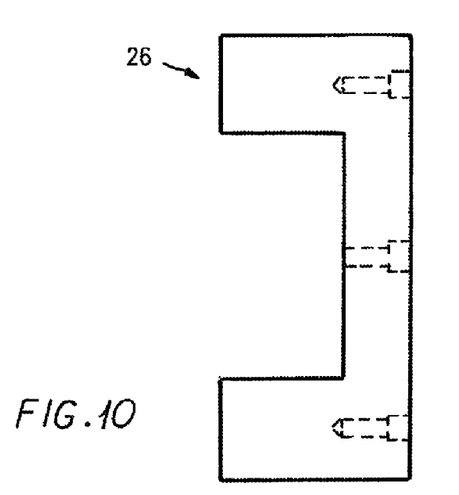
FIG. 10 is a top view of a first workpiece nest of the lightweight overhead conveyor pallet of the present invention.
Figure 11A:
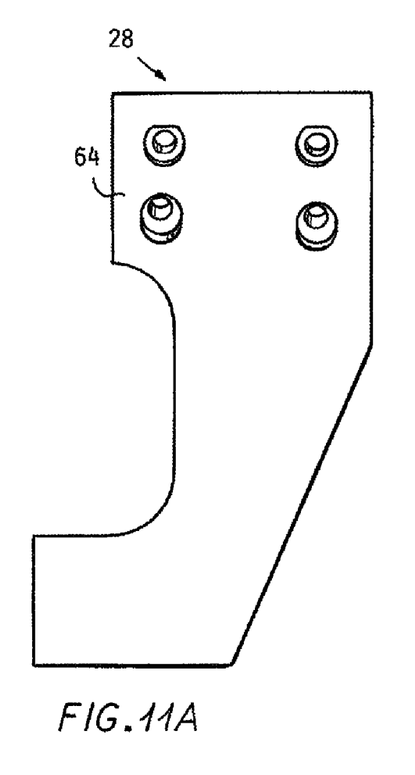
FIG. 11A is a side view of a second workpiece nest of the lightweight overhead conveyor pallet of the present invention.
Figure 11B:
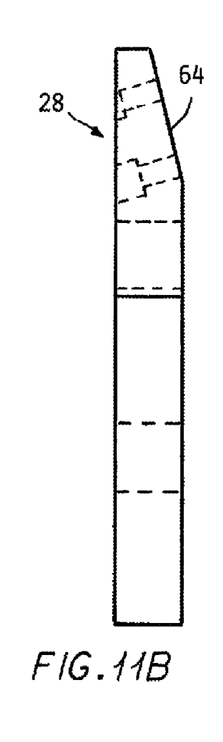
FIG. 11B is a front view of a second workpiece nest of the lightweight overhead conveyor pallet of the present invention.
Figure 12:
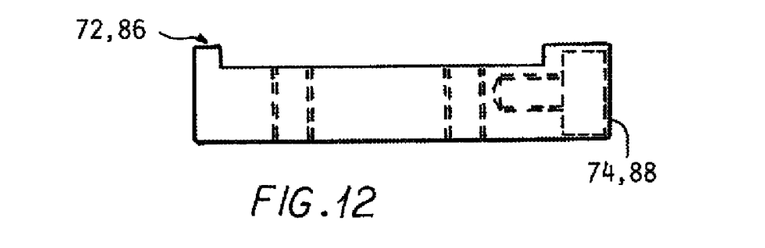
FIG. 12 is a top view of a first locator block of the lightweight overhead conveyor pallet of the present invention.
Figure 13A:
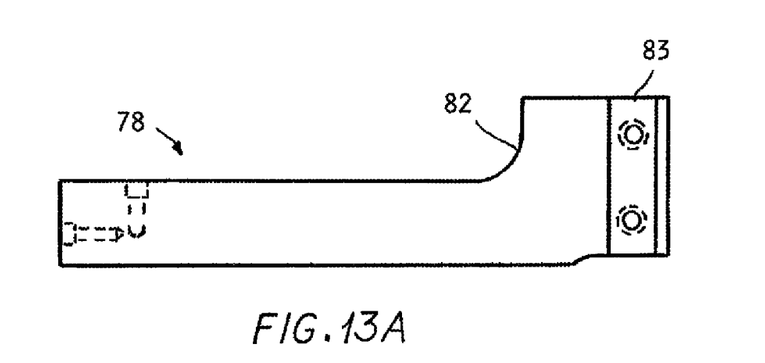
FIG. 13A is a top view of a locator support of the lightweight overhead conveyor pallet of the present invention.
Figure 13B:
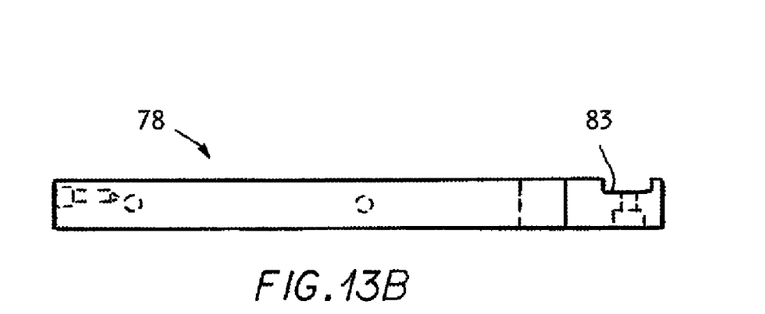
FIG. 13B is a front view of a locator support of the lightweight overhead conveyor pallet of the present invention.
Figure 14:
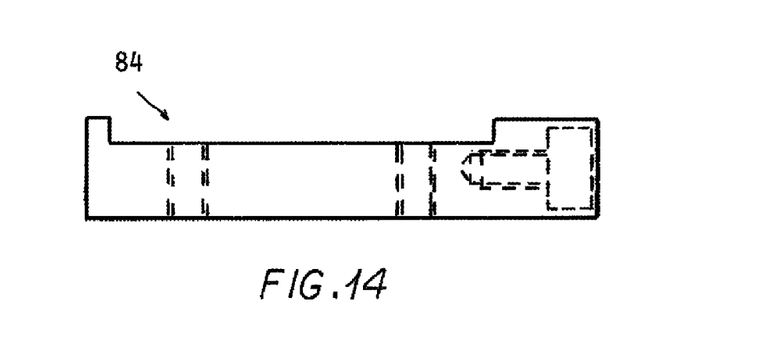
FIG. 14 is a top view of a second locator block of the lightweight overhead conveyor pallet of the present invention.
Figures 15, 16:
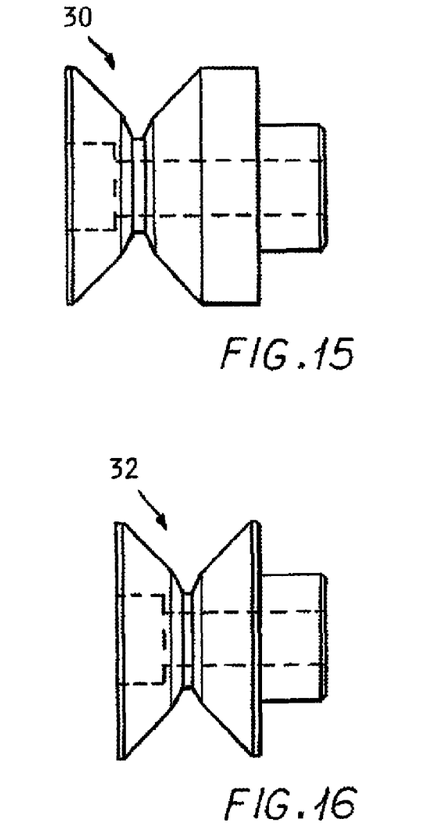
FIG. 15 is a side view of a first part rest of the lightweight overhead conveyor pallet of the present invention.
FIG. 16 is a side view of a second part rest of the lightweight overhead conveyor pallet of the present invention.
Figure 17:
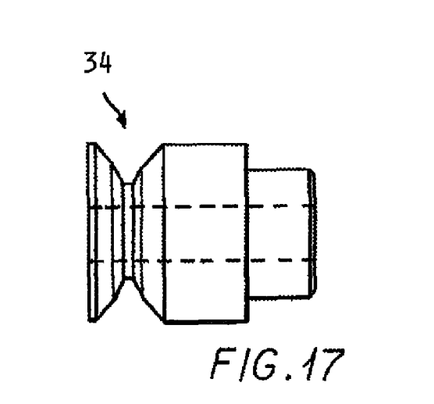
FIG. 17 is a side view of a third part rest of the lightweight overhead conveyor pallet of the present invention.

In order to hold and support the workpiece 12, the conveyor pallet 10 provides the workpiece nests 26, 28. As seen in FIGS. 1-2 and 10, the workpiece nest 26 has a substantially U-shaped, plate-like configuration that is fabricated from the same nylon or lightweight plastic material, as previously described. Once again, the use of the nylon or lightweight plastic material helps to reduce the overall weight of the conveyor pallet 10. The workpiece nest 26 has a side 62 which is connected to the lower angular portion 42 of the support member 18 through the use of conventional fasteners, such that the u-shaped configuration of the workpiece nest 26 extends outward from and substantially perpendicular to the lower angular portion 42 of the support member 18. The workpiece nest 26 is specifically configured for the particular workpiece 12. Thus, the workpiece nest 26 complementarily or matingly engages the workpiece 12 so as to help support and stabilize the workpiece 12 on the conveyor pallet 10. Thus, the workpiece nest 26 could be replaced with a workpiece nest having a different configuration so as to support a differently configured workpiece 12.

As seen in FIGS. 1-2 and 11A-11B, the workpiece nest 28 also has a plate-like configuration and is fabricated from the same nylon or lightweight plastic material to assist in the reduction of the weight of the conveyor pallet 10. The workpiece nest 28 has a substantially C-shaped configuration, wherein one end 64 of the workpiece nest 28 is connected to the lower rectangular portion 50 of the support member 20 through the use of conventional fasteners. The end 64 of the workpiece nest 28 that connects to the support member 20 has an angular surface such that the workpiece nest 28 extends outward at an angle from the support member 20. As noted with the workpiece nest 26, the workpiece nest 28 is designed specifically for the configuration of the workpiece 12. The design of the workpiece nest 28 is such that the workpiece 12 complementarily and/or matingly engages the workpiece 12 to help support and stabilize the workpiece 12 on the conveyor pallet 10. Thus, the workpiece nest 28 could be disconnected from the support member 20 and replaced with a workpiece nest having a different configuration so as to assist in supporting a different workpiece 12 configuration.

Although the workpiece nests 26, 28 help support and stabilize the workpiece 12, the conveyor pallet 10 provides the part rests 30, 32, 34 to specifically locate and support the weight of the workpiece 12. The part rest 30 is supported by a support rail 66 that is connected to the support member 18. As seen in FIGS. 1-2, 9A-9B, 12, and 15, the support rail 66 has a plate-like, substantially triangular configuration that is fabricated from the same nylon or high-strength plastic material, as previously discussed. The nylon or plastic material helps to reduce the overall weight of the conveyor pallet 10. In addition, the support rail 66 has a substantially triangular aperture 68 extending therethrough to help reduce the overall weight of the conveyor pallet 10. The support rail 66 is connected to a side 70 of the support member 18 through the use of conventional fasteners. The support rail 66 has a substantially u-shaped recess 69 at an end 74 thereof, in which a substantially u-shaped locator block 72 is interlockingly received. The substantially U-shaped locator block 72 is connected to the support rail 66 through the use of conventional fasteners. The locator block 72 is fabricated from a high-strength metallic material, such as steel, in order to help support the weight of the workpiece 12. The part rest 30 is connected to an end 76 of the locator block 72 through the use of a conventional fastener. The part rest 30 has a substantially cylindrical, hourglass configuration and is fabricated from a high-strength metallic material, such as steel, in order to help support the weight of the workpiece 12, as well as to prevent any damage to the part rest 30 caused by a sharp edge of the workpiece 12, which may be caused by an edge of a piece of sheet metal. The part rest 30 has a substantially hourglass configuration so that the workpiece 12 will slide to the center of the part rest 30 should the workpiece 12 be placed on an off-center location on the part rest 30. The part rest 30 is located in a position that is specific to the configuration and design of the workpiece 12. Thus, the part rest 30 may be moved to a location that is compatible with the workpiece 12.

A second support rail 78 is also connected to the support member 18 and supports the part rest 32, as seen in FIGS. 1-2, 13A-13B, 14, and 16. The support rail 78 has a plate-like, substantially L-shaped configuration and is also fabricated from a high-strength metallic material, such as steel, in order to support the weight of the workpiece 12. The support rail 78 is connected to a front face 80 of the support member 18 through the use of conventional fasteners. The support rail 78 extends inward toward the center of the conveyor pallet 10, wherein a short leg 82 of the L-shaped configuration of the support rail 78 extends away from the support member 18 toward the center of the conveyor pallet 10. The short leg 82 of the L-shaped configuration of the support rail 78 has a substantially U-shaped recess 83, which receives a locator block 84. The locator block 84 has a substantially rectangular configuration and is seated within the U-shaped recess 83 of the support rail 78. The locator block 84 is fabricated from a high-strength metallic material, such as steel, and is connected to the support rail 78 through the use of conventional fasteners. The part rest 32 is substantially similar to the part rest 30 in that the part rest 32 has a substantially hourglass configuration that is fabricated from a high-strength metallic material, such as steel. The part rest 32 is connected to the end of the locator block 84 through the use of a conventional fastener. Again, the location of the part rest 32 is dependant on the specific configuration of the workpiece 12, and therefore, the part rest 32 may be relocated to adapt to a workpiece 12 having a different configuration.

To support the part rest 34, a locator block 86 is connected to the support member 20, as seen in FIGS. 1-2, 14, and 16. The locator block 86 has a substantially U-shaped configuration that is fabricated from a high-strength metallic material, such as steel, in order to support the weight of the workpiece 12. In order to position the locator block 86 with respect to the support member 20, a substantially u-shaped recess 51 is formed on the support member 20, and the locator block 86 is interlockingly received therein. The locator block 86 is connected to the support member 20 through the use of conventional fasteners. The part rest 34 is substantially similar to part rests 30, 32 in that it has a substantially hourglass configuration and is fabricated from a high-strength metallic material, such as steel, in order to support the weight of the workpiece 12 and avoid any damage caused by sharp sheet-metal edges on the workpiece 12. The part rest 34 is connected to an end 88 of the locator block 86 through the use of a conventional fastener. Once again, the part rest 34 is located in a position that is specific to the configuration of the workpiece 12. Therefore, the part rest 34 may be relocated based on a different configuration of the workpiece 12.

In operation, the conveyor pallet 10 is supported and driven by the overhead transfer conveyor 1. The workpiece 12 is loaded onto the conveyor pallet 10 by having the workpiece 12 located and supported on the part rests 30, 32, 34 and the workpiece nests 26, 28. The workpiece 12 may provide for various apertures, recesses, or edges, which would allow the workpiece 12 to hang or be supported by the part rests 30, 32, 34. Other portions of the workpiece 12 would rest on or abut the workpiece nests 26, 28 in order to support and stabilize the workpiece 12 on the conveyor pallet 10. Once the workpiece 12 is properly located and supported on the conveyor pallet 10, the conveyor pallet 10 may then be driven by the overhead transport conveyor, thereby transporting the workpiece 12 to a desired location. Once at the desired location, the workpiece 12 may then be removed from the conveyor pallet 10. The conveyor pallet 10 is then driven by the overhead transfer conveyor 1 back to the beginning of the overhead transfer conveyor 1, wherein a new workpiece 12 may then be loaded onto the conveyor pallet 10.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is permitted under the law.

What is claimed is:

1. A lightweight pallet for supporting and carrying workpieces along a pair of opposing stationary rails of an overhead transfer conveyor, comprising:
   a metallic conveyor carrier having a plurality of rollers connected thereto and said rollers rollable with respect to said pair of stationary rails on said overhead transfer conveyor such that said carrier is moveable with respect to said overhead transfer conveyor;
   a lightweight, non-metallic base fixedly connected to said conveyor carrier;
   a first lightweight, non-metallic support member fixedly connected to and extending downward from said base, said first support member being substantially planar, wherein said first support member is adapted to support said workpiece; and
   a first lightweight, non-metallic brace member fixedly connected to said base and said first support member for stabilizing and supporting said first support member, and said first brace member being substantially planar, wherein said first brace member extends substantially perpendicular to said first support member, and said first support member and said second support member cooperate to define a structure that extends downward from said base.

2. The lightweight pallet of claim 1, further comprising:
   at least one lightweight, non-metallic workpiece nest connected to said first support member, wherein said workpiece nest is configured to complementarily engage at least a portion of said workpiece.

3. The lightweight pallet of claim 1, further comprising:
   at least one metallic part rest connected to said first support member for supporting and locating said workpiece.

4. The lightweight pallet of claim 1, further comprising:
   a u-shaped recess defined in said first support member;
   a locator block that is receivable within said u-shaped recess to position said locator block with respect to said first support member; and
   at least one metallic part rest connected to said locator block for supporting and locating said workpiece.

5. The lightweight pallet of claim 1, further comprising:
   said conveyor carrier being substantially planar; and
   said base being substantially planar, wherein said base and said conveyor carrier are connected in a substantially coplanar fashion.

6. The lightweight pallet of claim 1, further comprising:
   a second lightweight, non-metallic support member connected to and extending downward from said base, said second support member longitudinally spaced from said first support member, wherein said second support member is adapted to support said workpiece; and
   a second lightweight, non-metallic brace member connected to said base and said second support member for stabilizing and supporting said second support member.

7. A lightweight pallet for supporting and carrying workpieces along an overhead transfer conveyor having a stationary first rail and a stationary second rail, comprising:
   a metallic conveyor carrier adaptable to be carried by said overhead transfer conveyor, said metallic conveyor carrier having a first end with at least one roller rollably supportable by said first rail of said overhead transfer conveyor and said metallic conveyor carrier having a second end with at least one roller rollably supportable by said second rail of said overhead transfer conveyor, wherein said first end of said conveyor carrier is longitudinally spaced from said second end of said conveyor carrier and said conveyor carrier moves with respect to said first and second rail of said overhead transfer conveyor;
   a lightweight, non-metallic base fixedly connected to said conveyor carrier;
   a first lightweight, non-metallic support member fixedly connected to and extending downward from said base, wherein said first support member is adapted to support said workpiece; and
   a first lightweight, non-metallic brace member fixedly connected to said base and said first support member for stabilizing and supporting said first support member.

8. The lightweight pallet of claim 7, further comprising:
at least one lightweight, non-metallic workpiece nest connected to said first support member, wherein said workpiece nest is configured to complementarily engage at least a portion of said workpiece.

9. The lightweight pallet of claim 7, further comprising:
at least one metallic part rest connected to said first support member for supporting and locating said workpiece.

10. The lightweight pallet of claim 7, further comprising:
said first support member being substantially planar; and
said first brace member being substantially planar, wherein said first brace member extends substantially perpendicular to said first support member.

11. The lightweight pallet of claim 10, wherein said first support member and said second support member cooperate to define a substantially T-shaped structure that extends downward from said base.

12. The lightweight pallet of claim 7, further comprising:
a u-shaped recess defined in said first support member;
a locator block that is receivable within said u-shaped recess to position said locator block with respect to said first support member; and
at least one metallic part rest connected to said locator block for supporting and locating said workpiece.

13. The lightweight pallet of claim 7, further comprising:
said conveyor carrier being substantially planar; and
said base being substantially planar, wherein said base and said conveyor carrier are connected in a substantially coplanar fashion.

14. The lightweight pallet of claim 7, further comprising:
a second lightweight, non-metallic support member connected to and extending downward from said base, and said second support member longitudinally spaced from said first support member, wherein said second support member is adapted to support said workpiece; and
a second lightweight, non-metallic brace member connected to said base and said second support member for stabilizing and supporting said second support member.

15. A lightweight pallet for supporting and carrying workpieces along an overhead transfer conveyor having a stationary first rail and a stationary second rail, comprising:
a metallic conveyor carrier adaptable to be carried by said overhead transfer conveyor, and said conveyor carrier being substantially planar and having a first end with at least one roller rollably supportable by said first rail of said overhead transfer conveyor, and said metallic conveyor carrier having a second end with at least one roller rollably supportable by said second rail of said overhead transfer conveyor, wherein said first end of said conveyor carrier is longitudinally spaced from said second end of said conveyor carrier, and said conveyor carrier moves with respect to said first and second rail of said overhead transfer conveyor;
a lightweight, non-metallic base fixedly connected to said conveyor carrier, and said base being substantially planar, wherein said base and said conveyor carrier are connected in a substantially coplanar fashion;
a first lightweight, non-metallic support member fixedly connected to and extending downward from said base, wherein said first support member is adapted to support said workpiece;
a first lightweight, non-metallic brace member fixedly connected to said base and said first support member for stabilizing and supporting said first support member;
a second lightweight, non-metallic support member fixedly connected to and extending downward from said base, said second support member longitudinally spaced from said first support member, wherein said second support member is adapted to support said workpiece; and
a second lightweight, non-metallic brace member fixedly connected to said base and said second support member for stabilizing and supporting said second support member.

16. The lightweight pallet of claim 15, further comprising:
at least one lightweight, non-metallic workpiece nest connected to said first support member, wherein said workpiece nest is configured to complementarily engage at least a portion of said workpiece.

17. The lightweight pallet of claim 15, further comprising:
at least one metallic part rest connected to said locator block for supporting and locating said workpiece.

18. The lightweight pallet of claim 15, further comprising:
said first support member being substantially planar; and
said first brace member being substantially planar, wherein said first brace member extends substantially perpendicular to said first support member.

19. The lightweight pallet of claim 18, wherein said first support member and said second support member cooperate to define a substantially T-shaped structure that extends downward from said base.

20. The lightweight pallet of claim 15, further comprising:
a u-shaped recess defined in said first support member;
a locator block that is receivable within said u-shaped recess to position said locator block with respect to said first support member; and
at least one metallic part rest connected to said first support member for supporting and locating said workpiece.

\* \* \* \* \*

UNITED STATES PATENT AND TRADEMARK OFFICE
CERTIFICATE OF CORRECTION

PATENT NO. : 8,322,517 B1
APPLICATION NO. : 12/341319
DATED : December 4, 2012
INVENTOR(S) : Hurst et al.

Page 1 of 1

It is certified that error appears in the above-identified patent and that said Letters Patent is hereby corrected as shown below:

In Column 4, line 63, please delete "18, are" and insert -- 18, 20 are --.

Signed and Sealed this
Fifth Day of February, 2013

Teresa Stanek Rea
*Acting Director of the United States Patent and Trademark Office*